(12) United States Patent
Park Lee

(10) Patent No.: US 10,493,353 B2
(45) Date of Patent: Dec. 3, 2019

(54) PROTECTIVE EQUIPMENT FOR TRANSMITTING A SCORE IN SPORTS

(71) Applicant: Chuen Wook Park Lee, Barcelona (ES)

(72) Inventor: Chuen Wook Park Lee, Barcelona (ES)

(*) Notice: Subject to any disclaimer, the term of this patent is extended or adjusted under 35 U.S.C. 154(b) by 0 days.

(21) Appl. No.: 15/576,487

(22) PCT Filed: Feb. 5, 2016

(86) PCT No.: PCT/ES2016/070069
§ 371 (c)(1),
(2) Date: Nov. 22, 2017

(87) PCT Pub. No.: WO2017/134317
PCT Pub. Date: Aug. 10, 2017

(65) Prior Publication Data
US 2018/0326289 A1 Nov. 15, 2018

(51) Int. Cl.
*A63B 69/00* (2006.01)
*A63B 71/08* (2006.01)
*G01L 5/00* (2006.01)
*A63B 71/06* (2006.01)
*A63B 71/12* (2006.01)

(52) U.S. Cl.
CPC ........... *A63B 71/08* (2013.01); *A63B 69/004* (2013.01); *A63B 71/0605* (2013.01); *A63B 71/0669* (2013.01); *A63B 71/12* (2013.01); *G01L 5/00* (2013.01); *A63B 2220/17* (2013.01); *A63B 2220/53* (2013.01); *A63B 2244/10* (2013.01)

(58) Field of Classification Search
CPC .... A63B 69/004; A63B 71/0605; A63B 69/02
See application file for complete search history.

(56) References Cited

U.S. PATENT DOCUMENTS

| | | | |
|---|---|---|---|
| 2011/0251802 A1 | 10/2011 | Song | |
| 2011/0304497 A1* | 12/2011 | Molyneux | A43B 1/0054 342/42 |
| 2012/0037759 A1* | 2/2012 | Vorwald | B64D 1/22 244/137.4 |
| 2018/0326289 A1* | 11/2018 | Park Lee | A63B 71/08 |

FOREIGN PATENT DOCUMENTS

| | | |
|---|---|---|
| DE | 20 2010 004520 U1 | 8/2010 |
| EP | 0222640 A2 | 5/1987 |
| FR | 2898717 A1 | 9/2007 |
| KR | 101018038 B1 | 3/2011 |
| KR | 20130067404 A | 6/2013 |
| WO | 2004/004840 A1 | 1/2004 |

OTHER PUBLICATIONS

Extended European Search Report for Application No. 16889177.8, dated Oct. 29, 2018 in 6 pages.

* cited by examiner

*Primary Examiner* — Tajash D Patel
(74) *Attorney, Agent, or Firm* — Knobbe, Martens, Olson & Bear, LLP

(57) ABSTRACT

Protective equipment for transmitting sport scores, comprising a sensor positioned between two protective layers, characterised in that it has a foam material containing an elastomer and arranged so as to contact the sensor.

16 Claims, 8 Drawing Sheets

PROTECTIVE EQUIPMENT FOR TRANSMITTING A SCORE IN SPORTS

CROSS-REFERENCE TO RELATED APPLICATIONS

This application is the U.S. National Phase under 35 U.S.C. § 371 of International Application PCT/ES2016/070069, filed Feb. 5, 2016. The disclosures of the above-described application are hereby incorporated by reference in their entirety.

FIELD OF THE INVENTION

The present invention relates to protective equipment for transmitting scores in a sporting event.

BACKGROUND OF THE INVENTION

This type of equipment is used in particular sports, such as fencing and martial arts, for detecting when contact occurs between the contenders, the contender that makes the contact usually scoring a point.

At the same time, this equipment must serve the function of protecting the sportsperson from contact or hits. Said equipment usually comes in the form of, inter alia, chest guards, helmets, gloves or foot protectors.

The equipment according to the present invention is especially suitable for the competitive practice of martial arts, and more particularly taekwondo, though the invention is not necessarily limited to this application.e use of electronic protective equipment has changed the way in which competitive sport is practised. Judges consider any contact detected by the equipment to be valid, and as such, competitors have changed their strategy to make contact in a manner that can be detected by the equipment and converted into a subsequent score signal, even if these hits did not originally merit a score according to the rules of that sport.

WO200711145 discloses equipment of this type, specifically a chest guard, comprising two protective layers between which a piezoelectric sensor is positioned.

A problem with this type of equipment is that it detects a frontal hit and simple brushing against the equipment in the same way, the associated signals being indistinguishable. As a result, the equipment detects and transmits a score in either event. However, brushing against the opponent may not, in principle, be an objective of the sport.

SUMMARY OF THE INVENTION

An object of the present invention is that of providing means that allow the equipment to distinguish between both types of event and to not produce a score signal when the contact made is merely that of brushing against the equipment.

More particularly, the present invention discloses protective equipment for transmitting sport scores, comprising a sensor positioned between two protective layers, a foam material that contains an elastomer being arranged so as to contact the sensor.

The inventor has discovered that the combination of the resilient properties of the foam and the elastomeric properties of the material produces a cushioning effect that is sufficiently differentiated between hits and brushes against the sensor. As a result, the sensor produces a reduced signal for simple brushing and therefore does not emit a score signal when the contact received by the equipment is that of brushing. The effect is considerable, even when the same material is not placed between the outer surface of the equipment and the sensor, but is instead arranged between the inner side of the equipment and the sensor.

Said foam material can form an integral portion of one or both of said protective layers. Alternatively, the foam material can form a layer or independent layers of said two protective layers. The material can be in contact with the sensor on the front portion thereof, the inner portion thereof, or both.

In the present application, "front" refers to the portion that is intended to be oriented towards the outside of the equipment, i.e. intended to receive the hits, and "inner" refers to the portion intended to be in contact with the sportsperson. The equipment sensor separates the front and inner portions from one another.

Preferably, the elastomer material covers the sensor completely.

Preferably, said material is arranged so as to contact the front face of the sensor, i.e. the side facing the outer surface of the equipment.

More preferably, said foam material is arranged so as to contact the sensor on the front side thereof, i.e. the side facing outwards, and on the inner side thereof.

Advantageously, said two protective layers contain EVA (ethylene-vinyl acetate). More advantageously, the sensor is a piezoelectric sensor.

The piezoelectric sensor can be a planar sensor.

The sensor can also be a wire that extends through grooves machined into one of the protective layers, preferably into the front or outermost layer of the equipment.

Preferably, the route of the wire through the machined grooves has repeated and identical route sections in its central region.

More preferably, the entire route covered by the machined grooves is formed by repeated and identical route sections.

BRIEF DESCRIPTION OF THE DRAWINGS

To aid understanding, explanatory yet non-limiting drawings of an embodiment of the equipment according to the present invention are included.

DETAILED DESCRIPTION OF THE PREFERRED EMBODIMENTS

The figures show various embodiments of a chest guard -1- suitable for the competitive practice of martial arts, especially taekwondo. The invention can also be implemented in helmets, gloves, foot protectors, and any other type of protective equipment.

Figure 1:
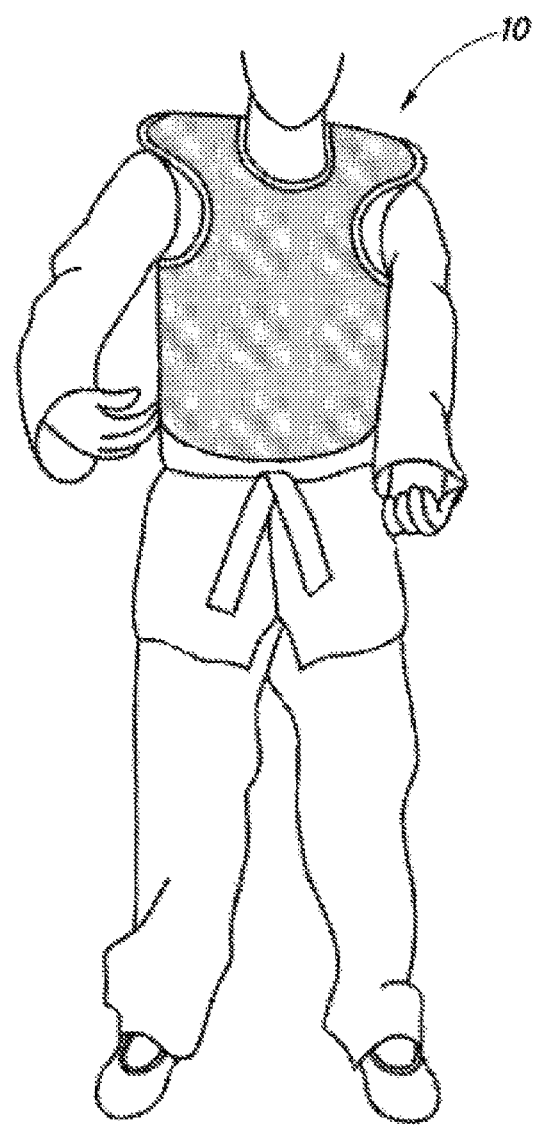
FIG. 1 schematically shows a sportsperson wearing protective equipment for transmitting sport scores, specifically a chest guard, according to the present invention.
Figure 2:
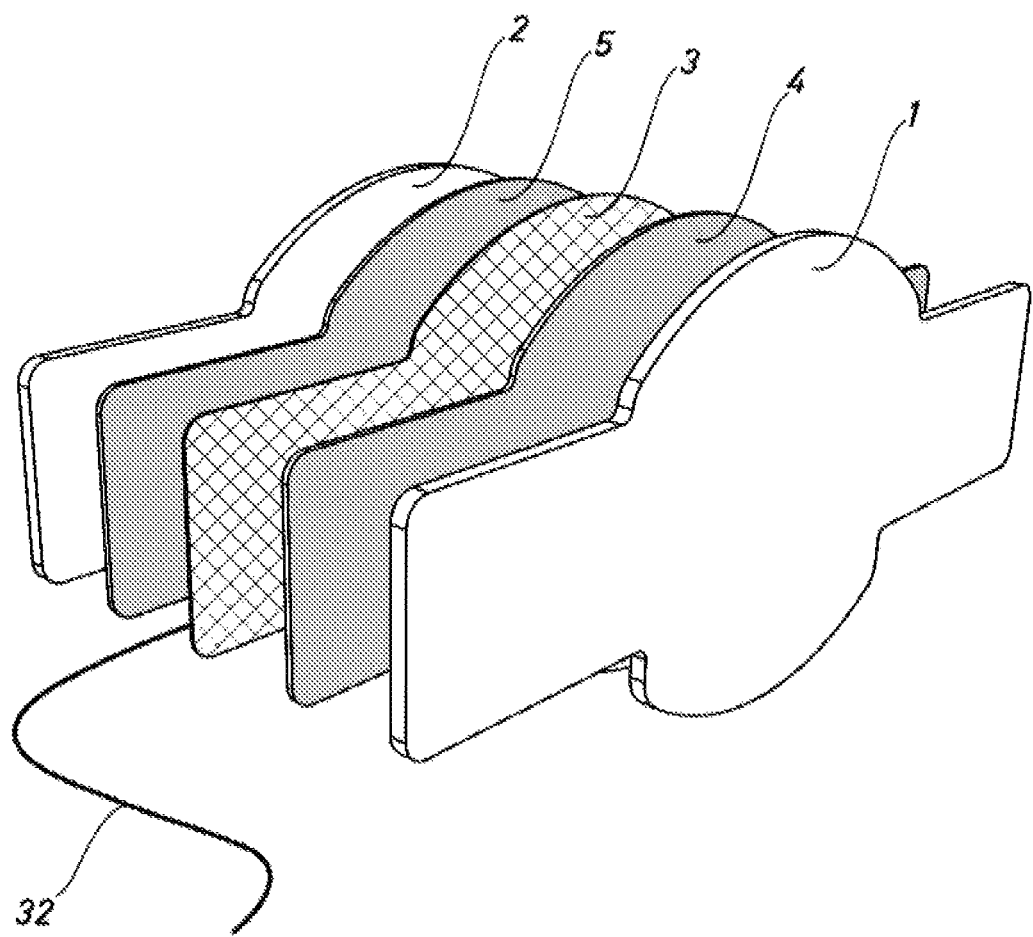
FIG. 2 is a perspective view of a first embodiment of the internal components of the chest guard from FIG. 1.
Figure 3:
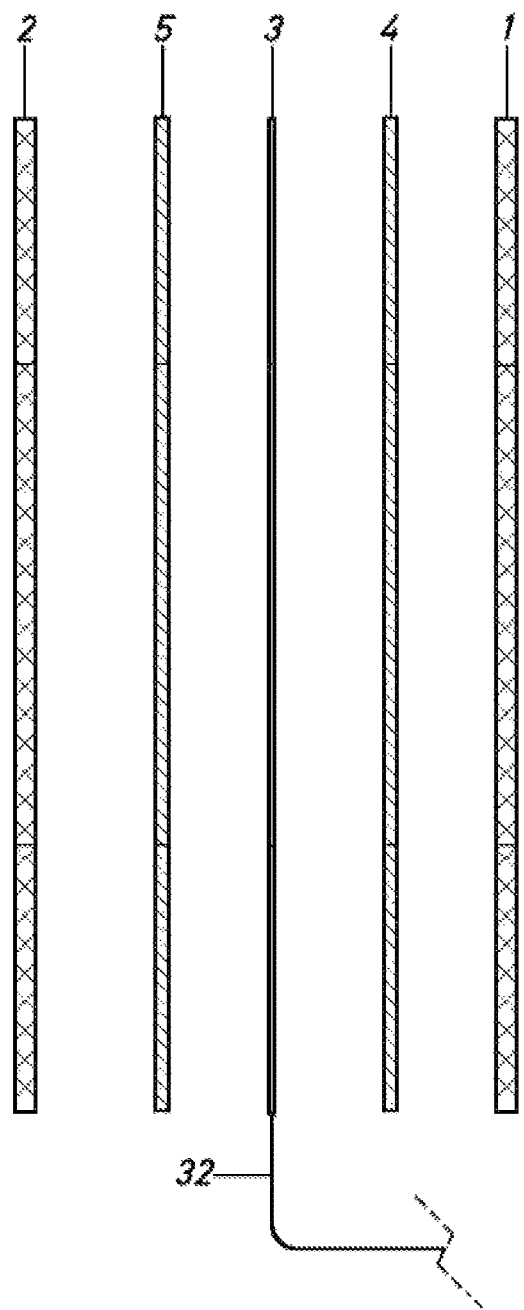
FIG. 3 is a vertical side view corresponding to the perspective view in FIG. 2.

FIG. 2 and FIG. 3 show a first embodiment of the internal components of the chest guard -10- from FIG. 1. The components comprise a central region of increased height for protecting the chest and two lateral wings of lesser height for protecting the sides and, possibly, the back.

The layers shown comprise a front protective layer -1- and an inner protective layer -2-. In this case, both layers can have the same dimensions. Both protective layers -1-, -2- can have the same or a different thickness and can both be made of EVA (ethylene-vinyl acetate).

A planar piezoelectric sensor -3- is positioned in the centre and emits a signal by means of a wire -32-. Alternatively, the sensor can also be a wireless sensor and not comprise said wire. A layer -4-, -5- of a foam material containing an elastomer is arranged in each case between a protective layer -1-, -2- and the sensor -3-.

The layers can be made of foams of thermoplastic elastomers (TPE), such as TPE-U (urethane-based) or TPE-V (thermoplastic mixed with vulcanised rubber), for example PP+EPM (polypropylene and ethylene-propylene rubber) foam or PP+EPDM (polypropylene and ethylene propylene diene monomer rubber) foam or a copolymer of ethylene-vinyl acetate. It can also be an EPDM (ethylene-propylene diene monomer rubber) foam.

The layers -4-, -5- of foam can be of a somewhat lesser thickness than the protective layers -1-, -2- since they are not intended to serve as protection, but rather are intended to cushion direct hits and hits that brush against the chest guard in different ways.

Figure 4:
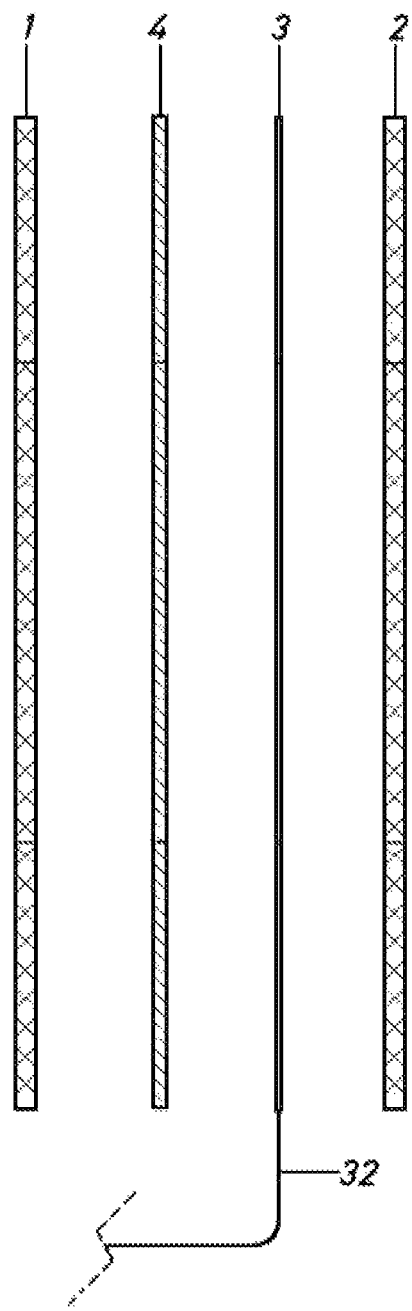
FIG. 4 is a vertical side view of a second embodiment of the internal components of the chest guard.
Figure 5:
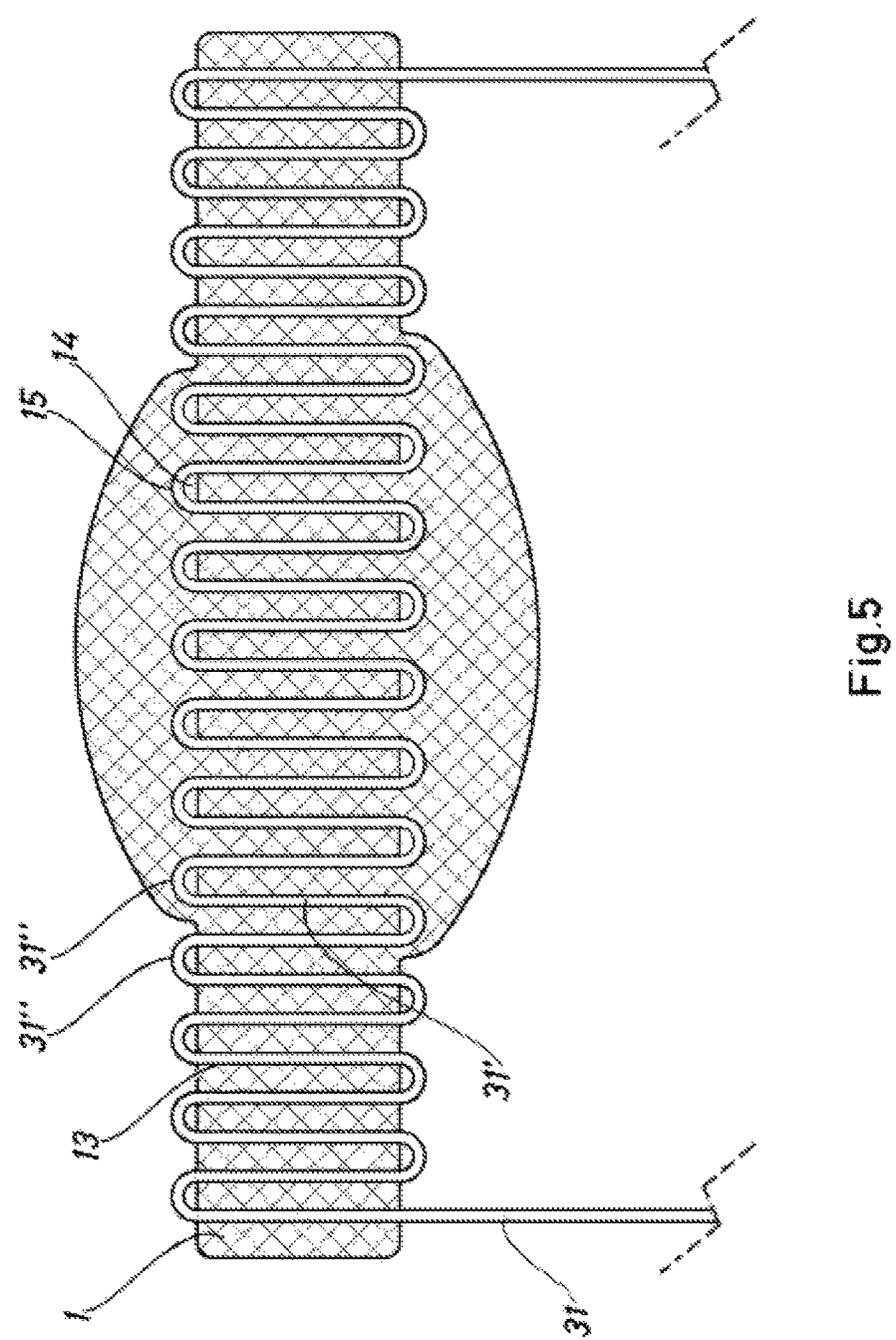
FIG. 5 is a view of the front protective layer and the sensor of a third embodiment of the equipment according to the present invention.
Figure 6:
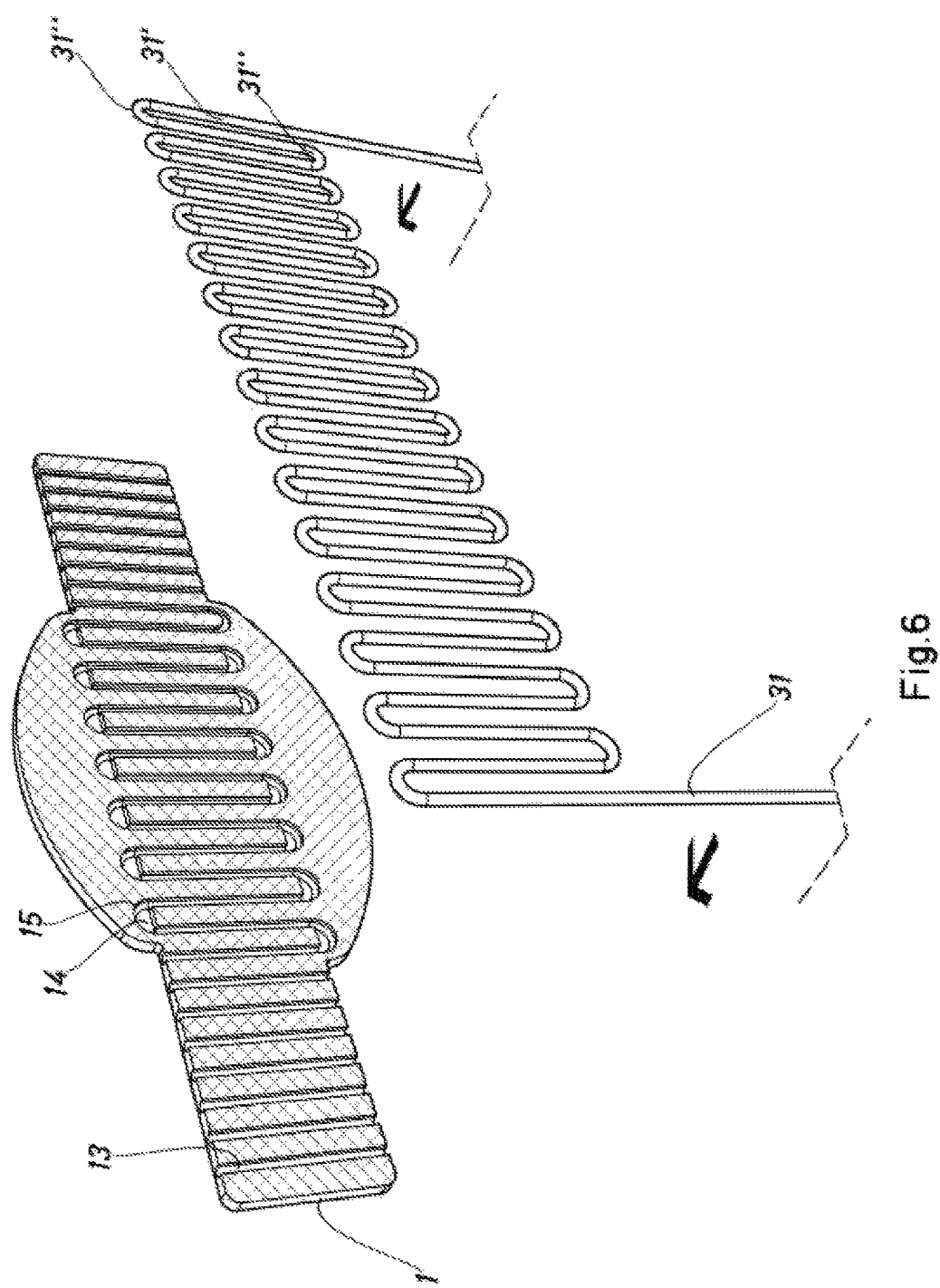
FIG. 6 corresponds to FIG. 5, the protective layer and the wire sensor having been separated for instructional purposes.
Figure 7:
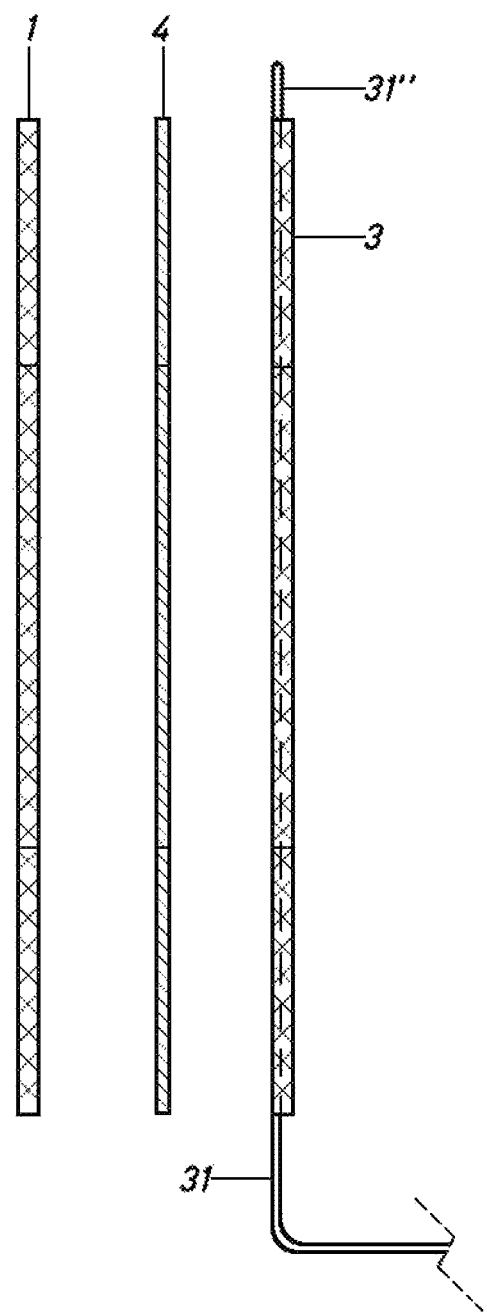
FIG. 7 is a vertical side view showing internal components of a chest guard according to the third embodiment according to the present invention.

FIG. 4 shows another embodiment in which only one layer -4- of foam material is arranged so as to contact the sensor -3-.

FIGS. 5 to 8 show a third embodiment of a chest guard according to the present invention.

Figure 8:
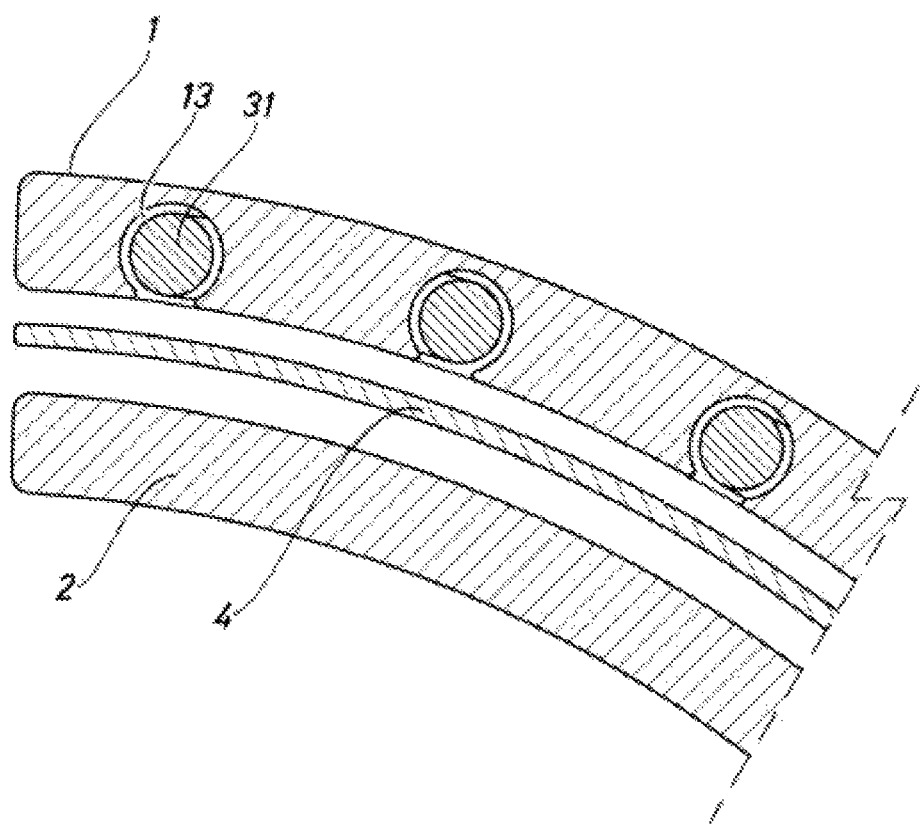
FIG. 8 shows a detail of the components from FIG. 7 seen from above.

In this case, the sensor is a piezoelectric wire -31- that is received by grooves -13-, -15- machined into the innermost surface of the front protective layer -1-. Preferably, the wire is inserted tightly into said groves. The wire repeats a standard route over the entire chest guard, alternating straight sections -31'- with U-turns -31"-, each section being identical to the others. In the higher region of the front protective layer -1-, the region -15- of the groove -13- that houses the U-turn -31"- of the wire comprises a hollow region -14-, as a result of which the forces on the U-turn region of the wire are equal in the regions where the wire makes a U-turn -31"- and in the regions where the U-turn -31"- is machined into the protective layer -1-. In the case shown, the wire is embedded more easily into the front protective layer -1- due to the fact that the user curves it in the manner shown in FIG. 8 when wearing the chest guard, which promotes penetration of the wire into the groove -13-. The layer of foam material -4- is positioned so as to contact the wire -31-, as shown in FIG. 8.

It would also be possible for the sensor wire -31- to be positioned in the inner protective layer -2-.

Although the invention has been set out and described with reference to embodiments thereof, it should be understood that these do not limit the invention, and that it is possible to alter many structural or other details that may prove obvious to persons skilled in the art after interpreting the subject matter disclosed in the present description, claims and drawings. Therefore, the scope of the present invention includes any variant or equivalent that could be considered covered by the broadest scope of the following claims.

What is claimed is:

1. A protective equipment for transmitting sport scores comprising:
   two protective layers,
   a sensor positioned between the two protective layers,
   a foam material containing an elastomer and being arranged so as to contact the sensor
   wherein the sensor is a single piezoelectric wire sensor,
   the single piezoelectric wire sensor extends through grooves machined into one of said protective layers, and
   the grooves comprise a region houses an U-turn portion of the single piezoelectric wire sensor.

2. The protective equipment according to claim 1, wherein the foam material is a thermoplastic elastomer foam.

3. The protective equipment according to claim 1, wherein the foam material is EPDM (ethylene propylene diene M-class rubber) foam.

4. The protective equipment according to claim 1, wherein said foam material forms an integral portion of one of the protective layers.

5. The protective equipment according to claim 1, wherein said foam material forms a layer that is independent of said two protective layers.

6. The protective equipment according to claim 1, wherein said material is arranged so as to contact a front face of the sensor.

7. The protective equipment according to claim 1, wherein said foam material is arranged so as to contact the sensor on a front side thereof, or on an inner side thereof.

8. The protective equipment according to claim 1, wherein said two protective layers contain EVA (ethylene-vinyl acetate).

9. The protective equipment according to claim 1, wherein the grooves machined into the one of said protective layers are disposed over entire length thereof.

10. The protective equipment according to claim 9, wherein the grooves are machined into the front protective layer.

11. The protective equipment according to claim 9, wherein the route of the wire through the machined grooves has repeated and identical route sections in its central region.

12. The protective equipment according to claim 11, wherein the entire route covered by the machined grooves is formed by repeated and identical route sections.

13. The protective equipment according to claim 1, wherein the grooves are machined into the innermost surface of the front protective layer.

14. The protective equipment according to claim 1, wherein the single piezoelectric wire sensor is inserted tightly into said grooves.

15. The protective equipment according to claim 12, wherein the region houses an U-turn portion of the single piezoelectric wire sensor comprises a hollow region.

16. The protective equipment according to claim 13, wherein the groove are positioned so that when a user curves the protective equipment by wearing, penetration of the wire into the groove is promoted.

* * * * *